United States Patent

[11] 3,603,856

| [72] | Inventors | David R. Zalar<br>Milwaukee;<br>Eugene L. Bilich, New Berlin, both of, Wis. |
|---|---|---|
| [21] | Appl. No. | 830,961 |
| [22] | Filed | June 6, 1969 |
| [45] | Patented | Sept. 7, 1971 |
| [73] | Assignee | The Louis Allis Company |

[54] ACCELERATION-DECELERATION CURRENT LIMIT
7 Claims, 2 Drawing Figs.

[52] U.S. Cl............................................. 318/231, 318/395, 318/434
[51] Int. Cl............................................ H02P 5/34
[50] Field of Search............................ 318/394, 395, 434, 231

[56]                  References Cited
             UNITED STATES PATENTS
3,177,418   4/1965   Meng ............................ 318/434

3,239,742   3/1966   Mierendorf et al. .......... 318/434
3,388,307   6/1968   Prapis et al. .................. 318/434
3,394,297   7/1968   Risberg ......................... 318/231

Primary Examiner—Oris L. Rader
Assistant Examiner—K. L. Crosson
Attorneys—C. E. Martine, Jr., Alfred B. Levine, Alan C. Rose and Daniel D. Fetterley ABSTRACT: A current limit for an AC motor drive that is operative whenever motor speed change is commanded and motor current exceeds the current limit value. The rate of change of motor speed is controlled to maintain maximum motor current, i.e., motor current substantially equal to the current limit. This is achieved by moderating the rate of change command to the motor drive circuit in accordance with the amount of motor current in excess of the current limit.

FIG. I

INVENTOR.
EUGENE L. BILICH
DAVID R. ZALAR
BY Stanley C. Corwin

ACCELERATION-DECELERATION CURRENT LIMIT

FIELD OF THE INVENTION

This invention relates to current limits circuits for AC motor drives. More particularly, the invention relates to current limit circuits operative during acceleration and deceleration of the motor to control motor current by controlling the rate of change of motor speed.

BACKGROUND OF THE INVENTION

The normal function of a current limit is to prevent the current of the machine being protected from exceeding a safe value. Protection by such circuits can consist of shutting down the machine or greatly slowing the response of the machine so that the current is within an acceptable value. Often, however, it is required that the machine respond in minimum time to a command. In such instances, the current limit must function while permitting rapid machine response. Given the desired time of response and load characteristics, a current limit circuit can be tailored to meet such requirements. However, such current limit circuits require continuous adjustment in order to accommodate loads of variable inertia when it is desired to provide optimum acceleration and deceleration rates.

SUMMARY OF THE INVENTION

It is accordingly an object of the present invention to provide a current limit capable of operating an AC motor at optimum acceleration-deceleration rates for unpredictable load characteristics.

Another object is to provide a current limit to control the rate of change of AC motor excitation frequency to maintain motor current substantially at the current limit during speed change.

In general, these objects are achieved by a current limit which becomes operative during motor speed change when the change is sufficient to cause motor current to exceed the current limit. The difference between actual motor current and the current limit reference is obtained and applied to a rate of change controlling circuit so that a motor excitation frequency command is applied to the motor drive circuit at a rate determined by the amount of excess motor current over the current limit. In this way the rate of change of motor speed is quickly adjusted to a rate capable of maintaining motor current substantially at the current limit.

BRIEF DESCRIPTION OF THE DRAWING

The object set forth and other inherent objects and advantages of the invention will be more readily understood from a detailed description of the invention with reference to the drawings, in which.

DETAILED DESCRIPTION OF THE DRAWINGS

Figure 1:
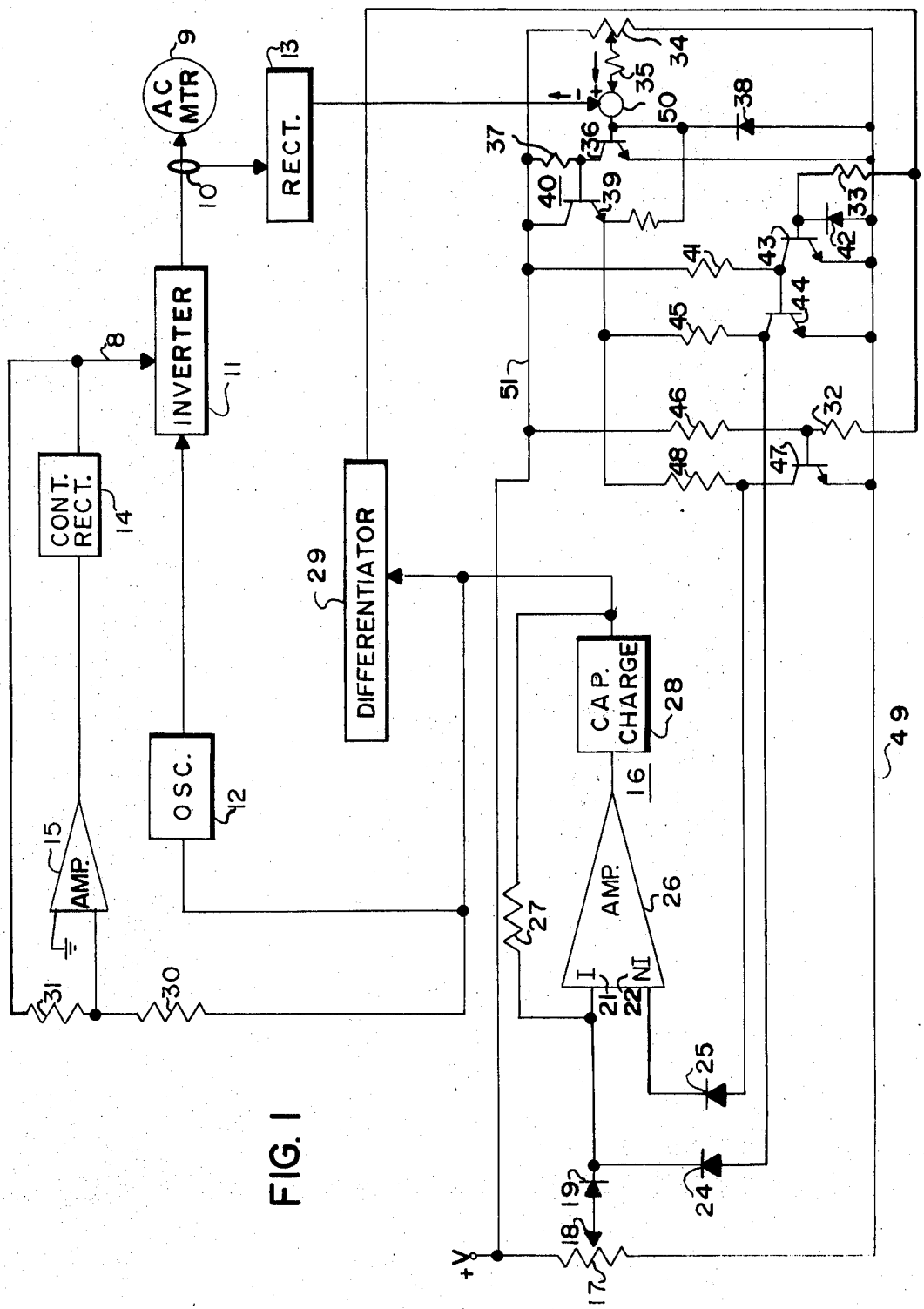
FIG. 1 is a partial block and partial schematic diagram of an AC motor drive system incorporating a current limit in accordance with the present invention.

Referring now to FIG. 1 there is shown a motor drive system for the AC motor 9 including a controlled rectifier 14 for rectifying AC power from a source not shown and applying controlled amplitude rectified power to an inverter 11. The inverter converts the DC supplied into an AC output having a frequency controlled by an oscillator 12. The inverter is preferably an SCR or transistor inverter of the static type, well known in the art. Amplifier 15 supplies a control signal to controlled rectifier 14 to adjust the amplitude of the rectified power.

The speed of motor 9, in the absence of current limit operation, is determined by potentiometer 17. A motor speed reference signal is selected by movement of the wiper 18 of the potentiometer 17. The voltage at wiper 18 is applied to an acceleration-deceleration control circuit 16 made up of a differential amplifier 26 and a capacitor charging circuit 28. A positive increase in speed reference signal voltage applied to the inverting input of amplifier 26 causes a negative going step voltage to appear at the output. This step voltage is applied to the capacitor charging circuit 28 which is programmed to charge at a predetermined rate selected to be the maximum rate of speed change for the motor under any condition. The changing capacitor voltage is applied back to the input of amplifier 26 by resistor 27 for stabilization purposes; to amplifier 15 via resistor 30 to proportionally increase the amplitude of the DC supply to the inverter; and to oscillator 12 to adjust the frequency of the inverter output accordingly. An increase in the speed of motor 9 to the level requested by the position of wiper 18 of potentiometer 17 follows, said increase occurring at the predetermined rate established by capacitor-charging circuit 28. By changing both the frequency and amplitude of the inverter output from the same source, the constant volts per cycle ratio as is necessary for optimum motor performance is obtained. To obtain the proper polarity for advanced motor speed from the negative going output of the capacitor charging circuit 28, oscillator 12 and amplifier 15 both provide polarity inversion.

A voltage indicative of the actual DC supply to the inverter is applied to the input of amplifier 15 by resistor 31. Resistors 30 and 31 amplifier 15, and controlled rectifier 14 thus constitute a network to obtain a voltage proportional to the motor excitation frequency and closely following its changes.

Often the inertia of the load being driven by the motor is greater than the motor can accelerate rapidly without drawing excessive current. It is possible to keep the motor current within safe limits and still accelerate the load if the speed change is achieved slowly enough. Accordingly, a current limit circuit which adjusts the rate of motor speed change to an optimum rate for maximum safe current values regardless of load characteristics is required. Such a circuit is shown in FIG. 1.

One of the features of the present invention is to control the rate of change of motor excitation frequency by the amount motor current exceeds a prescribed current limit. To this end, the current drawn by motor 9 is monitored by a current transformer 10, rectified by rectifier 13 and applied to a summing node 50 where it is compared with a current limit reference signal established by potentiometer 34. The arrows and polarity signs at the summing node indicate direction of current flow and the polarity of the voltages applied. Amplifier 40, made up of transistors 36 and 39, responds to the current error signal from summing node 50. This amplifier operates in the linear amplifying range to produce a magnified signal proportional to the amount of excess motor current. The amplifier's input transistor 36 is normally conducting so long as motor current is within the bounds of the current limit. The conduction of transistor 36 clamps the base of transistor 39 to the common 49 thereby preventing conduction of transistor 39. As motor current increases beyond the current limit, current is drawn away from the base of transistor 36 and it tends to turn off, turning transistor 39 on. When transistor 39 conducts, the amplified current error signal is applied to the collectors of transistors 44 and 47. These latter transistors constitute gating means controlling the application of the amplified current error signal produced by amplifier 40 to the acceleration-deceleration control amplifier 26.

Transistors 43 and 44 make up a first switch responsive to the output of differentiator 29 to permit passage of the output of amplifier 40 only when a pulse of positive polarity is applied to the base of transistor 43. Transistor 47 comprises a second gate or switch responsive to differentiator 29 to permit the output of the amplifier to pass to the acceleration-deceleration control circuit 16 when a negative polarity pulse is presented.

The differentiator 29 receives the output of the capacitor charging circuit 28. The differentiator is responsive only to voltage change and thus acts as a change-sensing circuit to produce a timing pulse of width equal in duration to the duration of the change of capacitor voltage and of polarity indicative of the direction of the capacitor voltage change.

Figure 2:
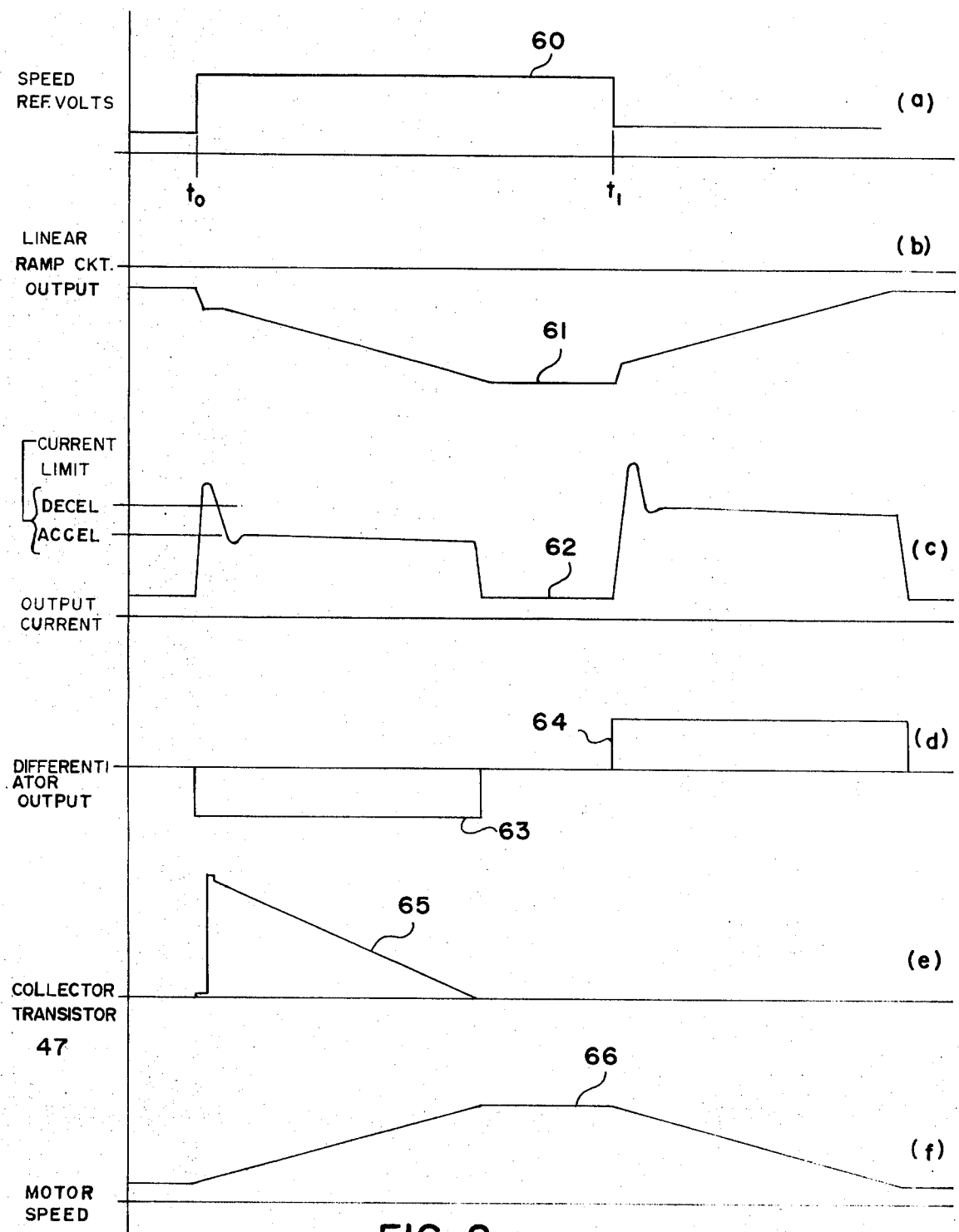
FIG. 2 shows various wave forms useful for better understanding of the current limit circuit.

The operation of the current limit circuit can now be described with reference to FIGS. 1 and 2. At time $t_0$, indicated in FIG. 2a, the position of the wiper 18 on potentiometer 17 is suddenly raised to call for higher motor speed. This is indicated by curve 60. This positive step voltage is inverted by the differential amplifier 26 and applied to the capacitor charging circuit 28. The capacitor in this charging circuit begins to charge negatively at the predetermined maximum rate as indicated by the initial descent in curve 61, FIG. 2b. This output is applied both to the inverter oscillator and to the control circuit for controlling the DC voltage to the inverter. FIG. 2c shows the rise in the motor current in response to this signal. As soon as the motor current exceeds the current limit reference signal, as determined at summing node 50, amplifier 40 is turned on to apply a voltage proportional to the current error signal to resistors 45 and 48. The change in the output voltage on the capacitor is recognized by the differentiator 29 and passed on to the bases of transistors 43 and 47 in the form of a timing pulse 63. This negative voltage pulse has no effect on the normally off transistor 43 and transistor 44 remains conducting to clamp the output end of resistor 45 to the common. The same negative voltage pulse applied to transistor 47 turns this normally conducting transistor off and the amplified error voltage is applied to the noninverting input 22 of amplifier 26 via resistor 48 and diode 25. This voltage from the switch 47 is therefore directly proportional to the motor current error, i.e., the amount of that specified by motor current in excess of the current limit reference signal. Since it is applied to the noninverting input of amplifier 26, it subtracts from the constant speed reference voltage applied by wiper 18 to the inverting output so that the rate of change of charge of the capacitor is reduced to a valve which maintains the motor current substantially at the current limit valve.

It should be noted that $T=J(d\omega/dt)$ for low friction loads, where $T$ is motor torque, $J$ is the inertia of the motor and the load and $d\omega/dt$ is the rate of change of motor speed and of excitation frequency because of the constant volts per cycle operation of motor 9. Since the torque is being held substantially constant (depending upon the gain of amplifier 40) by the current limit, the rate of change in motor speed $d\omega/dt$ is determined by the size of the inertia $J$.

FIG. 2 shows that in response to the acceleration command step voltage (curve 60 at $t_0$) being applied to the acceleration-deceleration control circuit 16 resulting in the initial fast charge of the capacitor, that the motor current, indicated by curve 62, quickly rises to provide the torque necessary to accelerate the inertia of the load. With sufficient load inertia and rate of speed increase, the current quickly exceeds the current limit indicated in FIG. 2c. As soon as the current limit has been exceeded, amplifier 40 immediately applies a signal proportional to the excess current to the collector of transistors 44 and 47. FIG. 2b shows that the output of the differentiator 63 has already been applied to bases of transistors 43 and 47 so that transistor 44 is conducting and transistor 47 is in a nonconducting state when the output of the amplifier 40 is applied to the collectors. As soon as the voltage output from transistor 47 is applied to the differential amplifier 26, the closed loop equation of the acceleration-deceleration control circuit is satisfied, i.e., the speed reference voltage minus the current limit feedback voltage minus the capacitor charge feedback voltage must equal zero, the rate of acceleration has been established. As the capacitor charges to the desired value at this rate, the output of transistor 47, i.e., the current error signal decreases as is shown by curve 65 at the same rate. This is occasioned by the slight decrease in motor current as the speed change command is gradually satisfied. The response of the motor is noted by curve 66 in FIG. 2f.

When a motor deceleration condition is desired, the wiper 18 of potentiometer 17 is moved down and the negative-going voltage step which is indicated by curve 60 at $t_1$ appears at the output of amplifier 26 as a positive-going voltage step. This causes the capacitor to begin charging in a positive direction at the predetermined maximum rate. It is again seen from curve 62 that motor current increases rapidly until the deceleration current limit is reached. FIG. 2c indicates that the deceleration current limit could be a value different from the acceleration current limit. The different direction of change of the charge on the capacitor causes the differentiator to put out a positive polarity pulse 64 as indicated in FIG. 2d so that now transistor 44 is off and transistor 47 is conducting. Thus, the amplified current error signal is applied to the acceleration-deceleration control circuit input 21 via resistor 45 and diode 24 to decrease the rate of change of capacitor voltage so that motor current is held substantially constant during deceleration.

While the principles of the invention have been illustrated by one detailed embodiment of the invention, it is to be understood that variations from this embodiment by those skilled in the art are to be expected and it is intended that the principles should only be limited by the scope of the appended claims.

What is claimed is:

1. In a drive system for an AC motor, said drive system having a power supply means for controlling the speed condition of the motor in direct response to an input signal thereto, accelerating or decelerating changes in said speed condition producing excessive current in the motor, an acceleration-deceleration current limit circuit comprising:

speed signal means for providing a signal corresponding to motor speed;

means for establishing a current limit magnitude for motor current;

means for determining motor current in excess of said current limit magnitude caused by a motor speed change and for developing a current error signal proportional to said excess; and signal rate of change control means coupled to the power supply means of the drive system, said control means being responsive to said speed signal for providing said speed signal to said power supply means as to input signal thereto, said control means being further responsive to said current error signal for limiting the rate of change of said input signal to that necessary to maintain motor current substantially at said current limit magnitude during speed change.

2. An acceleration-deceleration current limit circuit as recited in claim 1 wherein said signal rate of change control means is defined as responsive to said speed signal for developing a predetermined rate of change in said input signal in the absence of a current error signal and is further defined as responsive to the presence of said current error signal for moderating said predetermined rate of change in accordance with the magnitude of said current error signal.

3. An acceleration-deceleration current limit circuit as recited in claim 2 including timing means coupled to the output of said signal rate of change control means and responsive to said speed signal for producing timing pulses indicative of the duration and direction of changes in said speed signal, said circuit further including gate means responsive to said timing pulses for causing said current error signal to be applied to said signal rate of change control means only during the presence of said timing pulses.

4. An acceleration-deceleration current limit circuit as recited in claim 1 wherein said signal rate of change control means includes a capacitor-charging circuit having a variable signal rate of change output up to a maximum signal rate of change output.

5. An acceleration-deceleration current limit circuit as recited in claim 1 wherein said power supply means energizes the motor with constant volts per cycle energization over the speed range of the motor, said signal rate of change control means providing the speed signal to said power supply means for controlling the volts per cycle energization applied to the motor, and the speed thereof, proportional to said speed signal.

6. An acceleration-deceleration current limit circuit as recited in claim 5 wherein said power supply includes an inverter, controlled rectifier means to supply an adjustable voltage to said inverter and an oscillator for controlling the frequency of the AC voltage output of said inverter, said signal rate of change control means providing the speed signal to said inverter and controlled rectifier means for applying constant volts per cycle energization to the motor over the speed range thereof.

7. An acceleration-deceleration current limit circuit as recited in claim 3 wherein said timing means includes means responsive to the direction of signal change in said speed signal for producing a timing pulse of one polarity responsive to an accelerating speed signal change and a pulse of the other polarity responsive to a decelerating speed signal change, and said gate means includes a first gate circuit responsive to a timing pulse of one polarity to apply said current error signal to said signal rate of change control means under acceleration conditions and a second gate circuit responsive to a timing pulse of the other polarity to apply said current error signal to said signal rate of change control means under deceleration conditions.